(12) United States Patent
Kanouda et al.

(10) Patent No.: US 6,489,756 B2
(45) Date of Patent: Dec. 3, 2002

(54) DC-DC CONVERTER WITH SWITCHABLE CONTROL MODE

(75) Inventors: Akihiko Kanouda, Hitachinaka (JP); Kenichi Onda, Hitachi (JP); Norikazu Tokunaga, Hitachi (JP); Ryouhei Saga, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/805,108

(22) Filed: Mar. 14, 2001

(65) Prior Publication Data

US 2002/0080631 A1 Jun. 27, 2002

(30) Foreign Application Priority Data

Dec. 22, 2000 (JP) .................................... 2000-390693

(51) Int. Cl.⁷ .................................................. G05F 1/40
(52) U.S. Cl. ........................ 323/284; 323/272; 323/285
(58) Field of Search ................................ 323/272, 282, 323/284, 285

(56) References Cited

U.S. PATENT DOCUMENTS 5,448,155 A * 9/1995 Jutras ........................ 323/285
5,912,552 A * 6/1999 Tateishi ...................... 323/285
6,215,288 B1 * 4/2001 Ramsey et al. ............. 323/282

FOREIGN PATENT DOCUMENTS

| JP | 5-260727 | 10/1993 | .......... H02M/3/155 |
| JP | 10-14220 | 1/1998 | .......... H02M/3/155 |
| JP | 10-248244 | 9/1998 | .......... H02M/3/155 |
| JP | 11-89222 | 3/1999 | .......... H02M/3/155 |
| JP | 11-164550 | 6/1999 | .......... H02M/3/155 |
| JP | 11-341797 | 12/1999 | .......... H02M/3/155 |

* cited by examiner

Primary Examiner—Jeffrey Sterrett
(74) Attorney, Agent, or Firm—Mattingly, Stanger & Malur, P.C.

(57) ABSTRACT

In a voltage drop chopper type DC-DC converter, in an intermediate load area, a pulse train having a low peak value in the neighborhood of the threshold voltage is applied to a power MOSFET, whereby the power MOSFET is given a high ON resistance and turned on. By doing so, the output voltage is controlled by a PAM (pulse amplitude modulation) switch system for reducing the peak value below the supply voltage.

14 Claims, 11 Drawing Sheets

FIG. 5

CHANGEOVER SWITCH POSITION, CONTROL SYSTEM, AND WAVEFORM OF EACH UNIT

| CONTROL SYSTEM | CHANGEOVER SWITCH 12a | CHANGEOVER SWITCH 12b | VOLTAGE BETWEEN GATE AND SOURCE OF CHANNEL N POWER MOSFET 8a/8b $V_{Ga}, V_{Ga}$ | VOLTAGE BETWEEN DRAIN AND SOURCE OF CHANNEL N POWER MOSFET 8b $V_{DS}$ | OUTPUT CURRENT $I_{out}$ |
|---|---|---|---|---|---|
| PWM CONTROL | A | B | 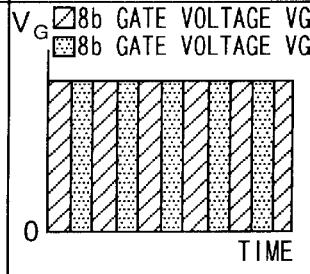 | 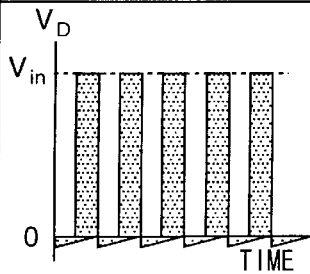 | 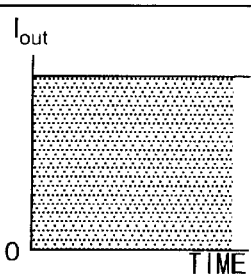 |
| PFM CONTROL | A | B | 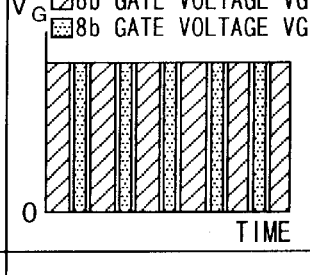 | 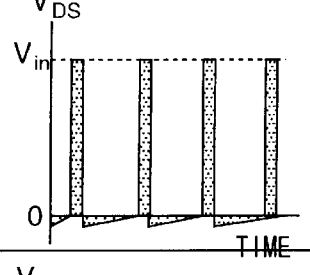 | 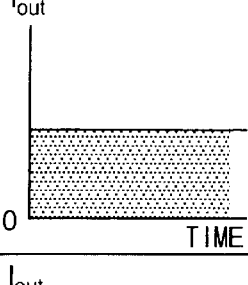 |
| PAM SWITCH CONTROL | A | A | 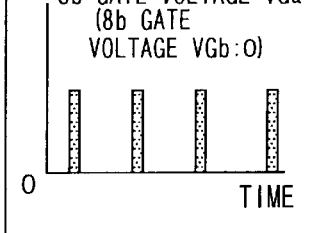 | 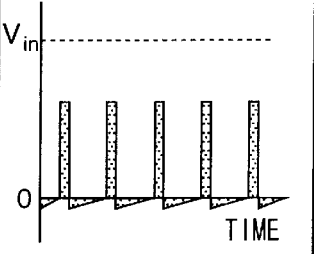 | 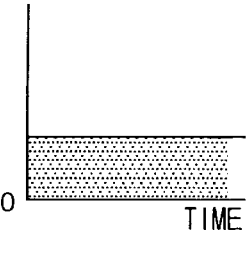 |
| LINEAR REGULATOR CONTROL | B | A | 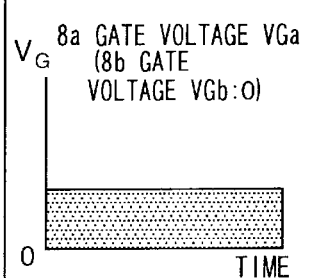 | 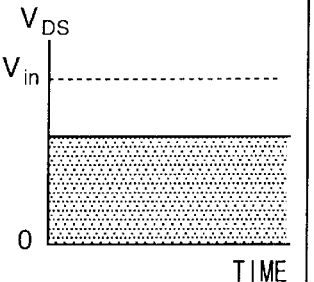 | 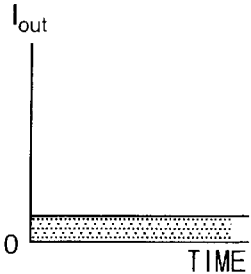 |

FIG. 10

CHANGE-OVER SWITCH POSITION OF EACH CONTROL SYSTEM

|  | CHANGEOVER SWITCH 12d | CHANGEOVER SWITCH 12e | SWITCH 39 |
|---|---|---|---|
| PWM CONTROL | A | A | OFF |
| PFM CONTROL | A | A | OFF |
| PAM SWITCH CONTROL | A | B | ON |
| LINEAR REGULATOR CONTROL | B | B | ON |

FIG. 12

CHANGE-OVER SWITCH POSITION OF EACH CONTROL SYSTEM

|  | CHANGEOVER SWITCH 12d | SWITCH 39 |
|---|---|---|
| PWM CONTROL | A | ON |
| PFM CONTROL | A | ON |
| PAM SWITCH CONTROL | A | OFF |
| LINEAR REGULATOR CONTROL | B | OFF |

DC-DC CONVERTER WITH SWITCHABLE CONTROL MODE

BACKGROUND OF THE INVENTION

The present invention relates to a DC-DC converter.

As a power unit of a device using a battery as an energy source such as a portable telephone and a mobile-related device, a linear regulator is general. In this linear regulator, the loss in the holding area having a small supply (load) current is comparatively small, though a loss depending on the product of the load current and the differential voltage between the supply voltage and the output voltage is generated. An example that this point is taken into account is indicated in "Control Method for Voltage Drop Chopper Type DC-DC Converter" disclosed in Japanese Patent Application Laid-Open No.11-341797.

The constitution, operation, and problems of a conventional voltage drop chopper type DC-DC converter will be explained by referring to FIG. 15. In FIG. 15, numeral 1 indicates a DC source, 2 a channel P power MOSFET, 3 a reflux diode, 4 a DC reactor, 5 a smoothing condenser, 6 a load, 21 an output feedback circuit, 22 a PWM (pulse width modulation) control circuit, and 23 a change-over switch.

When the load 6 is a rated load, the change-over switch 23 is kept down on the side of the PWM control circuit 22. By doing this, the output voltage feedback circuit 21 inputs the voltage of the smoothing condenser 5, amplifies the difference from a preset output voltage reference value, and outputs it as an error signal (an analog signal). The PWM control circuit 22 converts the error signal output from the output voltage feedback circuit 21 to a pulse train, turns the channel P power MOSFET2 ON or OFF by the pulse train, thereby executes the PWM control of the voltage.

On the other hand, when the load 6 is reduced to a light load, the PWM control circuit 22 switches the change-over switch 23 to the direction in which the error signal output from the output voltage feedback circuit 21 is directly applied to the channel P power MOSFET2. In this state, the error signal output from the output voltage feedback circuit 21 is immediately applied to the gate electrode of the channel P power MOSFET2. By doing this, the channel P power MOSFET2 operates as an amplifier (a variable resistor) driven by the error signal and operates as a linear regulator for dropping and outputting the voltage input from the DC source 1.

Meanwhile, in correspondence with advanced devices using a battery as an energy source such as a portable telephone and a mobile-related device, improvement of the processing capacity of a CPU (central processing unit) incorporated in these devices is a necessary problem and the CPU is apt to reduce the supply voltage due to increasing of the processing speed. As a result, a power unit mounted in these devices requires voltage drop type DC-DC power conversion having a large difference between the input voltage and the output voltage compared with the conventional one. In these devices using a battery as a power supply, needless to say, the power conversion efficiency of the power unit is an important factor.

However, it cannot be said that the conventional power unit as mentioned above has a sufficient conversion efficiency against the tendency of the CPU of reduction in supply voltage. Firstly, the efficiency η in the linear regulator operation is almost expressed by the following formula assuming the input voltage as Vin and the output voltage as Vout:

$$\eta = Vout/Vin \quad \text{(Formula 1)}$$

From Formula 1, η is proportional to the output voltage Vout under the condition that the input voltage Vin is fixed, so that when the output voltage Vout decreases, the efficiency η decreases.

On the other hand, with respect to the PWM control, it is well known that as the load is made lighter, the switching loss and driving loss are dominant and the efficiency η decreases remarkably.

SUMMARY OF THE INVENTION

An object of the present invention is to solve a problem that in a DC-DC converter, the efficiency reduces in a light load area or an area having a large difference in output voltage.

The present invention reduces the control loss by the PWM control, PAM switch control, or linear regulator control depending on the load condition or by controlling the output voltage by switching the PWM control, PAM switch control, or linear regulator control and concretely, the present invention is:

a DC-DC converter for converting and outputting the voltage of a DC source to a more lower DC voltage by controlling a semiconductor device characterized in that the peak value of the pulse train to be applied to the control terminal of the semiconductor device is changed, thereby the ON voltage of the semiconductor device is adjusted and the DC voltage to be output is controlled stably, or a DC-DC converter for converting and outputting the voltage of a DC source to a more lower DC voltage by controlling a semiconductor device characterized in that the pulse width of the pulse train to be applied to the control terminal of the semiconductor device is adjusted and the output voltage is controlled and when the output current is reduced to a predetermined value or less, the peak value of the pulse train is changed in the state that the pulse width is kept at a predetermined value, thereby the ON voltage of the semiconductor device is adjusted and the output voltage is controlled stably, or a DC-DC converter for converting and outputting the voltage of a DC source to a more lower DC voltage by controlling a semiconductor device characterized in that when the load factor is higher than a predetermined value, the frequency of the pulse train to be applied to the control terminal of the semiconductor device is controlled and when the load factor is lower than the predetermined value, the peak value of the pulse train is changed, thereby the ON voltage of the semiconductor device is adjusted and the output voltage is controlled stably, or a DC-DC converter for converting and outputting the voltage of a DC source to a more lower DC voltage by controlling a semiconductor device characterized in that the frequency of the pulse train to be applied to the control terminal of the semiconductor device is adjusted and the output voltage is controlled and when the output current is reduced to a predetermined value or less, the frequency is kept at a predetermined value and the peak value of the pulse train is changed, thereby the ON voltage of the semiconductor device is adjusted and the output voltage is controlled stably, or a DC-DC converter for converting and outputting the voltage of a DC source to a more lower DC voltage by controlling a semiconductor device characterized in that the peak value of the pulse train to be applied to the control terminal of the semiconductor device is changed, thereby the ON voltage of the semiconductor device is adjusted, and when the load factor is lower than a predetermined value, the control for applying the pulse train to the control terminal is changed to the control for continuously increasing or decreasing the voltage to be applied to the control terminal, thereby the output voltage is controlled stably, or a non-insulated voltage drop type DC-DC converter for converting and outputting the voltage of a DC source to a more lower DC voltage by controlling a semiconductor device characterized in that at a rated load, the pulse width of the pulse train to be applied to the control terminal of the semiconductor device is adjusted to a predetermined value or more and the output voltage is controlled and when the output current is reduced to the first predetermined value or less, the pulse width is adjusted to the predetermined value, and the frequency of the pulse train is limited to a predetermined value or higher, and the output voltage is controlled, and when the output current is reduced less than the second value which is smaller than the first value, the frequency is adjusted to the predetermined value and the peak value of the pulse train is changed, thereby the ON voltage of the semiconductor device is adjusted and the output voltage is controlled, and when output current is reduced less than the third value which is smaller than the second value, the control for applying the pulse train to the control terminal is changed to the control for continuously increasing or decreasing the voltage to be applied to the control terminal, thereby the output voltage is controlled stably, or a DC-DC converter for converting and outputting the voltage of a DC source to a more lower DC voltage by controlling a semiconductor device characterized in that the DC source is connected to one output terminal of the semiconductor device and the peak value of the pulse voltage to be output to the other output terminal of the semiconductor device is changed, thereby the output voltage is controlled stably.

BRIEF DESCRIPTION OF THE DRAWINGS

FIG. 5 is a drawing showing the position of each of the change-over switches, the control systems, and the waveform of each unit of the second embodiment of the present invention.

FIG. 10 is a drawing showing the relationship between the position of each of the change-over switches and the control systems of the fourth embodiment of the present invention.

FIG. 12 is a drawing showing the relationship between the position of each of the change-over switches and the control systems of the fifth embodiment of the present invention.

DETAILED DESCRIPTION OF THE PREFERRED EMBODIMENTS

The first embodiment of the DC-DC converter of the present invention will be explained hereunder by referring to FIGS. 1, 3, and 4.

Figure 1:
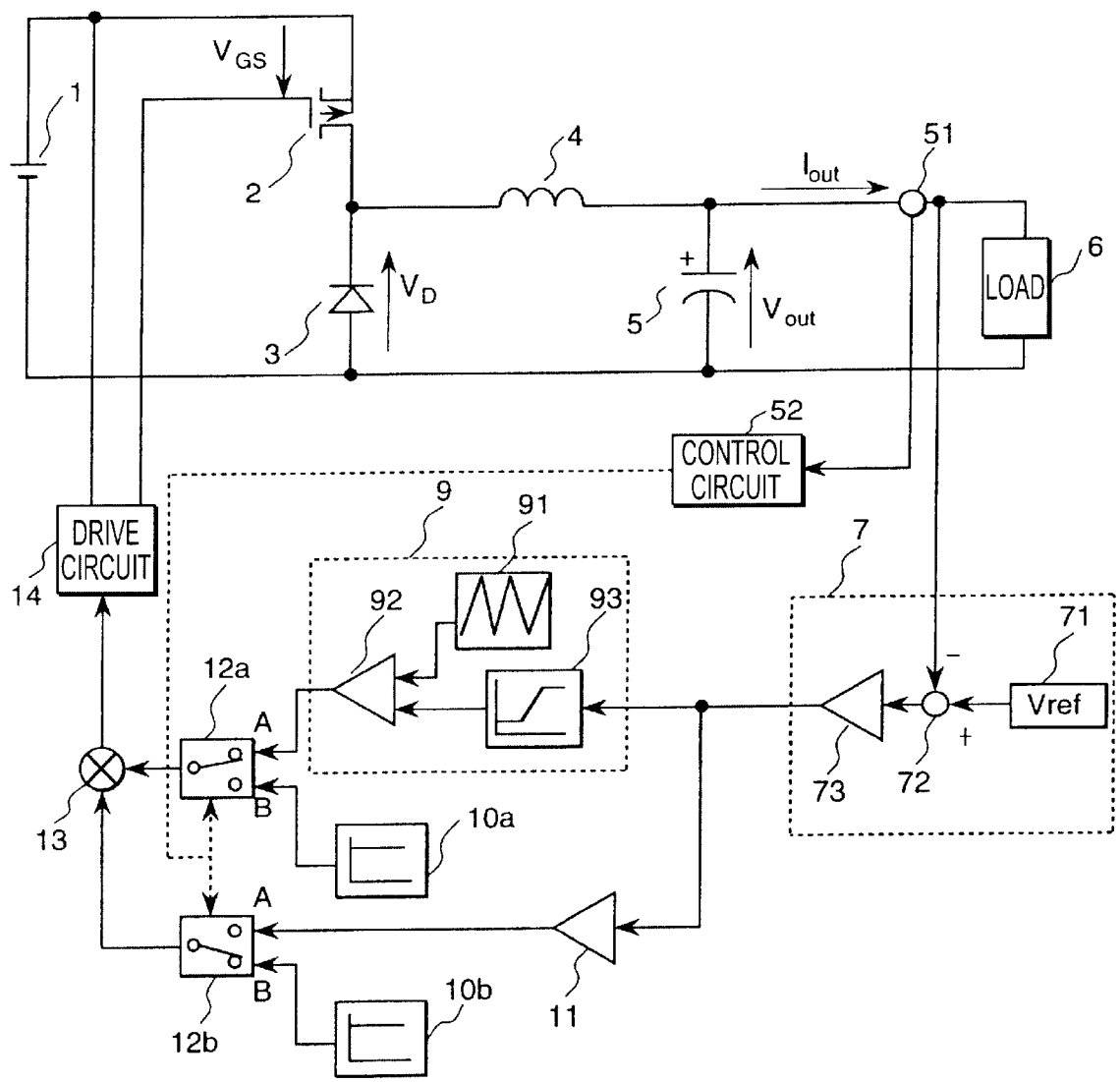
FIG. 1 is a block diagram of a DC-DC converter showing the first embodiment of the present invention.

FIG. 1 is a block diagram showing the basic constitution of the first embodiment. In FIG. 1, numeral 1 indicates a DC source, 2 a channel P power MOSFET, 3 a reflux diode, 4 a DC reactor, 5 a smoothing condenser, 6 a load, 7 an output feedback circuit, 9 a switching control circuit, 10a and 10b fixed-value output means, 11 an amplifier, 12a and 12b change-over switches, 13 a multiplier, 14 a drive circuit, 51 a load current detector, 52 a control characteristic control circuit, 71 a reference voltage, 72 a subtracter, 73 an error amplifier, 91 a triangular wave generation means, 92 a comparator, and 93 a limiter.

The DC source 1 generates a DC voltage using a battery as an energy source. The channel P power MOSFET2 functions as a switching operation or a resistor and drops the DC voltage output from the DC source 1. The reflux diode 3, the DC reactor 4, and the smoothing condenser 5 smooth the voltage output from the channel P power MOSFET2. The output feedback circuit 7 compares the DC voltage to be output (applied to the load 6) with the reference voltage and outputs an error voltage signal. The switching control circuit 9 generates a pulse train signal for PWM control of the channel P power MOSFET2 according to the error voltage signal. The fixed-value output means 10a and 10b and the amplifier 11 output a peak value control signal for PAM control and linear regulator control. The control characteristic control circuit 52 selectively switches PWM control, PAM switch control, and linear regulator control depending on the load condition.

To realize this control function, the positive pole of the DC source 1 is connected to the source of the channel P power MOSFET2. The drain of the channel P power MOSFET2 is connected to one terminal of the DC reactor and the cathode of the ref lux diode 3. The other terminal of the DC reactor is connected to the positive pole of the smoothing condenser 5. The negative pole of the smoothing condenser 5, the anode of the reflux diode 3, and the negative pole of the DC source 1 are connected commonly. The load 6 is connected to both ends of the smoothing condenser 5.

The voltage of the positive pole of the smoothing condenser 5 (the load 6) is input to the—input terminal of the subtracter 72 installed inside the output feedback circuit 7. The reference voltage 71 is input to the + input terminal of the subtracter 72. The output of the subtracter 72 is input to the error amplifier 73 and the output of the error amplifier 73 is input to the limiter 93 installed inside the switching control circuit 9 as error signal output of the output feedback circuit 7 and also input to the amplifier 11.

The output of the limiter 93 and the output of the triangular wave generation means 91 are input to the input terminal of the comparator 92. The output of the comparator 92 is input to the contact A of the change-over switch 12a installed outside the switching control circuit 9. The output of the fixed-value output means 10a is input to the contact B of the change-over switch 12a. The output of the amplifier 11 is input to the contact A of the change-over switch 12b. The output of the fixed-value output means 10b is input to the contact B of the change-over switch 12b. The output of the change-over switch 12a and the output of the change-over switch 12b are input to the multiplier 13. The output of the multiplier 13 is input to the drive circuit 14. The output of the drive circuit 14 is input to the gate and source of the channel P power MOSFET2 respectively.

The control characteristic control circuit 52 inputs a load current detection signal from the load current detector 51, decides the load condition, and switches and controls the contacts of the change-over switches 12a and 12b according to the decision result.

Figure 2:
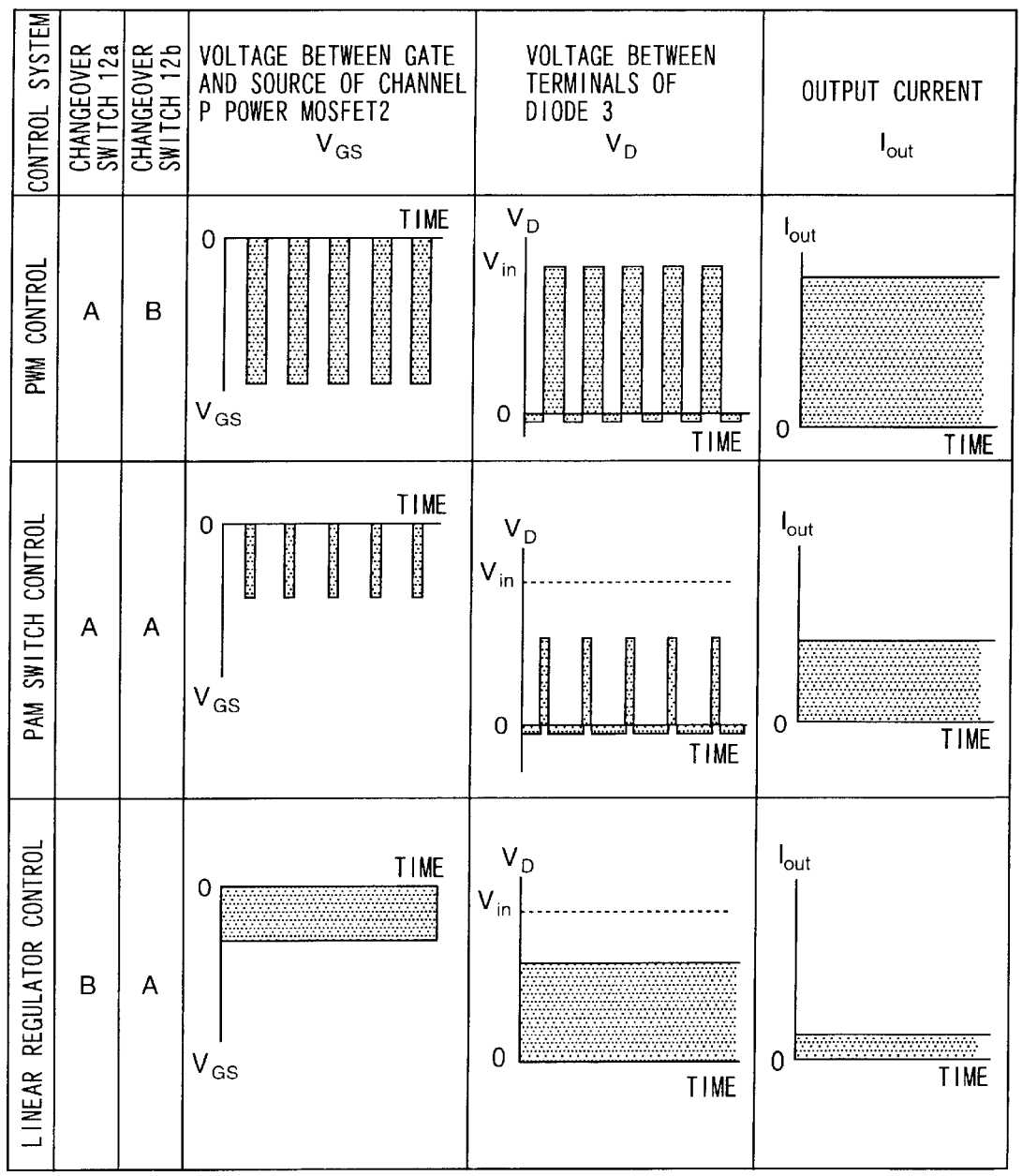
FIG. 2 is a drawing showing the position of each of the change-over switches, the control systems, and the waveform of each unit of the first embodiment of the present invention.

FIG. 2 shows the position of each of the change-over switches, the control system, and the voltage and current waveform of each unit in this embodiment. FIG. 3 shows the relationship between the load factor, VD pulse width, and peak value of the VD pulse.

Next, the operation of this embodiment will be explained.

Firstly, when the output current is close to the rated current and the load factor is in the rated load area close to 100%, the control characteristic controller 52, when the change-over switch 12a is connected to the contact A and the change-over switch 12b is connected to the contact B, controls the output voltage constant by the PWM (pulse width modulation system) control.

In the rated load area, the output feedback circuit 7 inputs the output voltage Vout which is the voltage at both ends of the smoothing condenser 5 and outputs the differential voltage from the reference voltage 71 from the subtracter 72. The error amplifier 73 amplifies this error voltage and outputs it as an error voltage signal. The error voltage signal is input to the limiter 93 inside the switching control circuit 9. The limiter 93 specifies the ratio at the maximum and the ratio at the minimum of the PWM control. The input error voltage is compared with the output signal of the triangular wave generation means 91 by the comparator 92 via the limiter 93 and output from the comparator 92 as a pulse train signal.

In the rated load area, the control characteristic control circuit 52 controls the contact A of the change-over switch 12a in the connection state, so that the pulse train signal output from the comparator 92 is input to the multiplier 13 via the change-over switch 12a. Further, the control characteristic control circuit 52 controls the contact B of the change-over switch 12b in the connection state, a fixed value which is output of the fixed-value output means 10b is input to the multiplier 13 via the change-over switch 12b. Then, the multiplier 13 does multiplication of the fixed value and pulse train signal and outputs a pulse train having a fixed peak value. The pulse train is input to the drive circuit 14 and the voltage VGS between the gate and the source as indicated in the PWM control column shown in FIG. 2 is output and applied between the gate and the source of the channel P power MOSFET2. The peak value of the pulse train is sufficiently higher than the threshold voltage of the channel P power MOSFET2, thereby the channel P power MOSFET2 performs the ON/OFF switching operation.

When a voltage is applied between the gate and the source, the channel P power MOSFET2 turns on and reduces the voltage between the gate and the source to almost 0 V (voltage drop). In this case, the DC source 1, the DC reactor 4, and the smoothing condenser 5 are connected in series, and a current IL flows in the DC reactor 4, and the smoothing condenser 5 is charged. The inter-terminal voltage of the diode 3 is almost equal to the input voltage Vin. When the voltage between the gate and the source is reduced to 0 V, the channel P power MOSFET2 turns off. When the channel P power MOSFET2 turns off, the current flowing in the channel P power MOSFET2 moves to the diode 3 and the drain voltage of the channel P power MOSFET2 is changed to a negative voltage which is lowered from 0 V by the forward drop voltage of the diode. As a result, a waveform as indicated in the PWM control column shown in FIG. 2 is generated between the terminals of the diode 3. The DC reactor 4 and the smoothing condenser 5 smooth the voltage waveform of the diode 3. This control system operates so as to keep the output voltage Vout constant and ensure the output (load) current Iout.

In the PWM control, when the output current Iout decreases, thereby the load factor decreases, the output voltage Vout is likely to increase, so that the error voltage signal output from the output feedback circuit 7 is reduced in number and the pulse width of the pulse train signal for driving between the gate and the source of the channel P power MOFET2 is narrowed in correspondence with it. As a result, as shown in FIG. 3, the VD pulse width which is the width of the pulse voltage appearing at both ends of the diode 3 is narrowed as the load factor reduces. However, in the rated load area, the peak value of the VD pulse is fixed.

In the PWM control, the minimum ON pulse width which is a minimum value of the VD pulse width is determined by the limiter 93 and when the load factor reduces to the neighborhood of the minimum ON pulse width, the PWM control is switched to the PAM switch control indicated below, which controls the output voltage. Switching to the PAM switch control is realized by deciding the load condition by the control characteristic control circuit 52 on the basis of the load current detection signal input from the load current detector 51 and switching the change-over switch 12b to the contact A connection condition with the contact A connection condition of the change-over switch 12a kept when the area is changed to the intermediate load area.

By doing this, the output of the amplifier 11 is input to the multiplier 13 and multiplied by the pulse train which is the output of the comparator 92. As a result, the output of the multiplier 13 becomes a pulse train with the minimum ON pulse width whose peak value is changed according to the error voltage signal output from the output feedback circuit 7.

Therefore, the voltage between the gate and the source of the channel P power MOSFET2 which has the output waveform of the drive circuit 14 has a waveform as indicated in the PAM switch control column shown in FIG. 2. The peak value of this waveform is lower than the peak value of the pulse train of the PWM control and close to the threshold voltage of the channel P power MOSFET2. When a voltage close to the threshold voltage is applied between the gate and the source, the channel P power MOSFET2 has an extremely high ON resistance compared with a case turned ON in the PWM control, thereby drops the voltage, so that the inter-terminal voltage VD of the diode 3 is lower than the input voltage Vin like the waveform indicated in the PAM switch control column shown in FIG. 2. When the channel P power MOSFET2 is off, in the same way as with the PWM control, VD becomes a negative voltage which is lowered from 0 V by the forward drop voltage of the diode 3. This is a point. different from the case of the PWM control.

The DC reactor 4 and the smoothing condenser 5 smooth the voltage waveform VD of the diode 3. As mentioned above, the PAM switch control system adjusts the peak value of the gate voltage of the channel P power MOSFET2 so as to ensure the output current Iout and keep the output voltage Vout constant, thereby controls the peak value of the VD pulse to be applied to the diode 3. In the intermediate load area for executing the PAM switch control, as shown in FIG. 3, the pulse width of the VD pulse is almost constant and the peak value of the VD pulse changes according to the load factor.

In the PAM switch control, when the load factor decreases more, the error voltage signal output from the output feedback circuit 7 is decreased in number more, and the peak value of the pulse train for driving between the gate and the source of the channel P power MOSFET2 is reduced in correspondence with it. In the light load area where the load factor is reduced less than a predetermined value, the PAM switch control is switched to the linear regulator control, which controls the output voltage.

Figure 3:
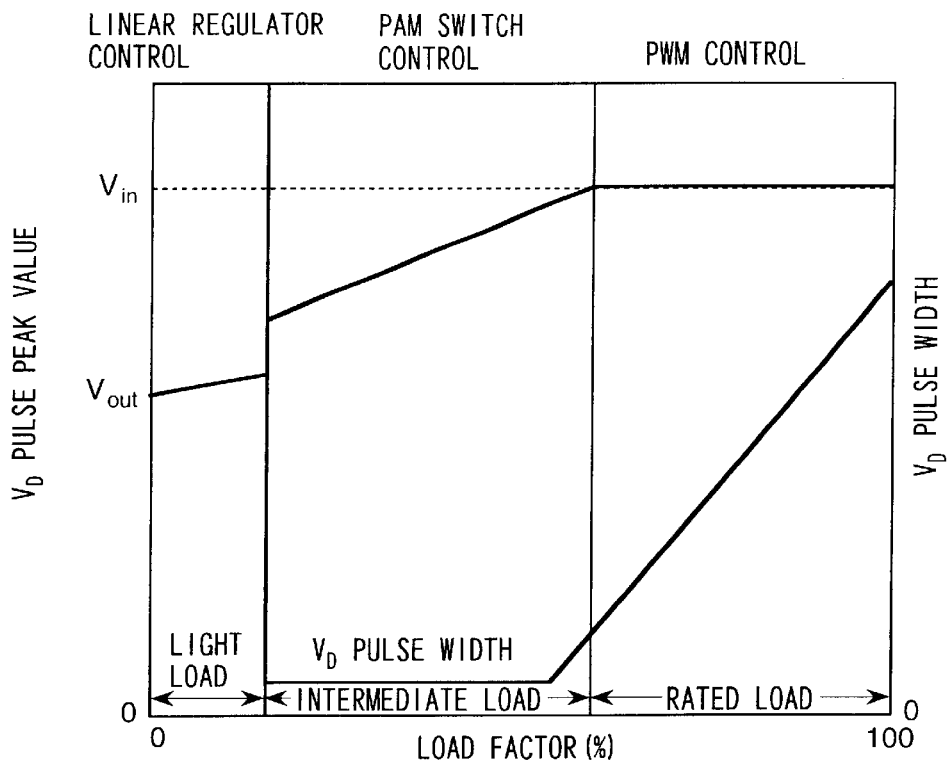
FIG. 3 is a characteristic diagram showing the relationship between the load factor, pulse width, and pulse peak value of the first embodiment of the present invention.

Switching from the PAM switch control to the linear regulator control is realized, as shown in FIG. 3, by switching the change-over switch 12a to the contact B with the contacts connection condition of the change-over switch 12b kept unchanged. The contact switching is executed when the control characteristic control circuit 52 enters the light load area on the basis of the load current detection signal from the load current detector 51.

In the linear regulator control, the pulse train which is the output of the comparator 92 is not input to the multiplier 13 and a fixed value which is the output of the fixed-value output means 10a is input to the multiplier 13 instead of it. On the other hand, the error voltage signal output from the output feedback circuit 7 is input to the multiplier 13 via the amplifier 11 and the contact A of the change-over switch 12b. As a result, the output of the multiplier 13 is on the continuous voltage level changing according to the error voltage signal output from the output feedback circuit 7.

By doing this, the voltage between the gate and the source of the channel P power MOSFET2 which is the output of the drive circuit 14 has the waveform indicated in the linear regulator control column show in FIG. 2. The peak value of this waveform is also lower than the peak value of the pulse train of the PWM control in the same way as with the peak value in the case of the PAM switch control and close to the threshold voltage of the channel P power MOSFET2. When a voltage close to the threshold voltage is applied between the gate and the source, since the channel P power MOSFET2 has an extremely high ON resistance compared with a case turned ON in the PWM control, a voltage drop occurs and the inter-terminal voltage VD of the diode 3 is a continuous value lower than the input voltage Vin like the waveform indicated in the linear regulator control column shown in FIG. 2.

In the linear regulator control, a voltage close to the threshold voltage is continuously applied between the gate and the source of the channel P power MOSFET2 like this, and the voltage is controlled, and the ON resistance of the channel P power MOSFET2 is continuously controlled, thereby the output voltage Vout is controlled to a fixed value. The diode 3 is always set to a reverse bias and a smooth current flows in the DC reactor 4.

In this embodiment, the channel P power MOSFET2 can be replaced with a bipolar transistor. Further, unless the linear regulator control is executed, it is possible to respond to the range of load factor from 0 to 100% only by switching the PWM control and the PAM switch control. In this case, the change-over switch 12a and the fixed-value output means 10a are not necessary.

Next, the second embodiment of the present invention will be explained by referring to FIGS. 4, 5, and 6. The same reference numerals are assigned to the parts, circuits, and means having the same functions as those in the first embodiment shown in FIG. 1 and the duplicate explanation will be omitted. This embodiment has a constitution that the intermediate load area is divided into two areas (intermediate high load area and intermediate low load area), and in the intermediate high load area, the voltage control by the PFM control is executed, and in the intermediate low load area, the voltage control by the PAM switch control is executed.

Figure 4:
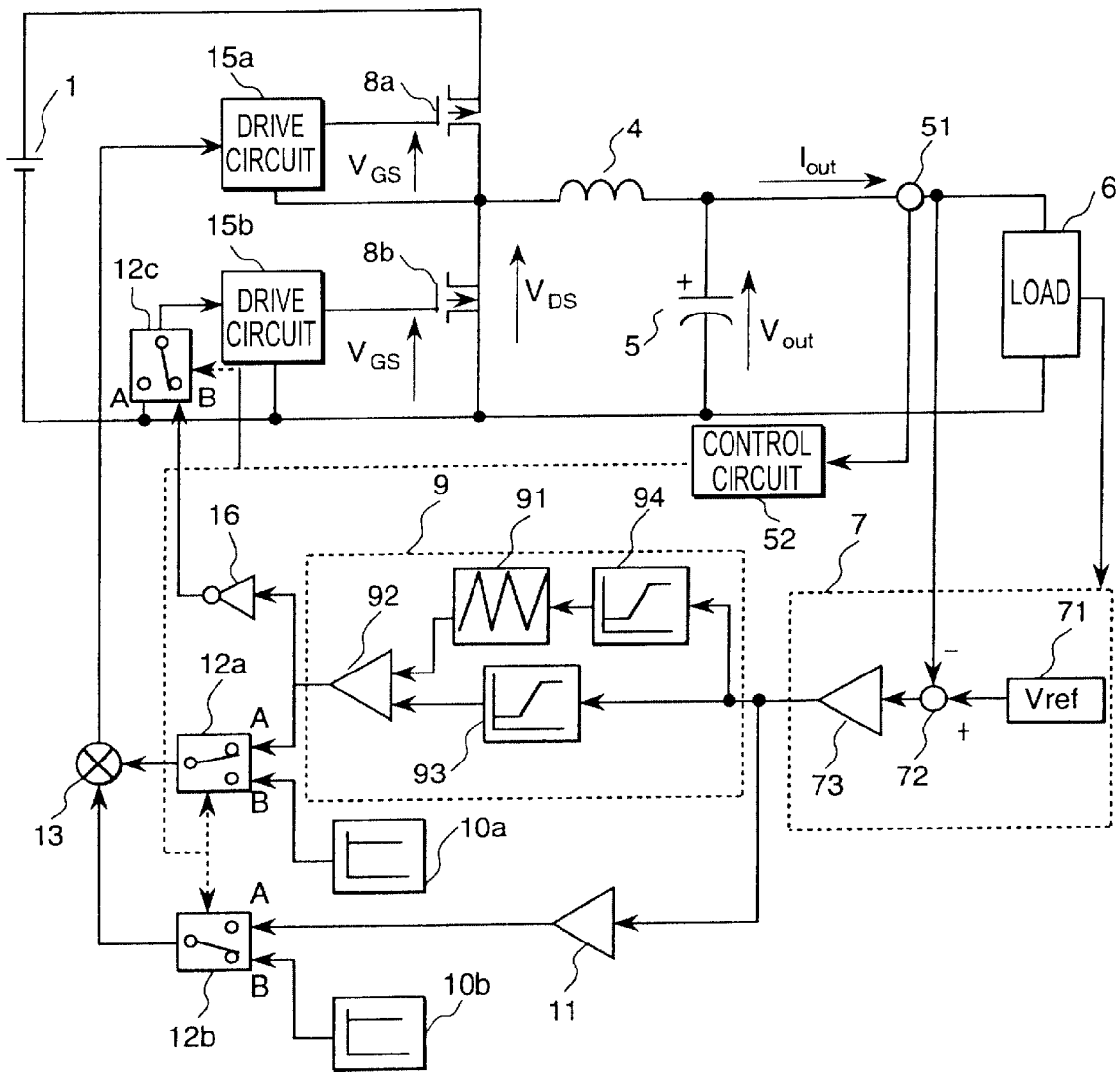
FIG. 4 is a block diagram of a DC-DC converter showing the second embodiment of the present invention.

In FIG. 4, numerals 8a and 8b indicate channel N power MOSFETs, 12c a change-over switch, 15a and 15b drive circuits, 16 a NOT circuit, and 94 a limiter. The control characteristic control circuit 52 controls the contact connection condition of each of the change-over switches 12a, 12b, and 12c so as to selectively execute the PWM control, PFM control, PAM switch control, and linear regulator control depending on the load condition.

The drain of the channel N power MOSFET8a is connected to the positive pole of the DC source 1 and the source is connected to the drain of the channel N power MOSFET8b and the DC reactor 4. The drive circuit 15a is connected so that the output thereof is supplied to the gate and source of the channel N power MOSFET8a. Further, the source of the channel N power MOSFET8b is connected to the negative pole of the DC source 1 and the negative pole of the smoothing condenser 5. The drive circuit 15b is connected so that the output thereof is supplied to the gate and source of the channel N power MOSFET8b.

The error voltage signal output from the output feedback circuit 7 is input to the triangular wave output means 91 via the limiter 94. The triangular wave output means 91 in this embodiment is structured so as to change the frequency of a triangular wave to be output depending on the input voltage.

The output of the comparator 92 is input to the contact B of the change-over switch 12c via the NOT circuit 16. The contact A of the change-over switch 12c is connected to the negative pole of the DC source 1. The contact A connects the instruction signal line from the load 6 to the output feedback circuit 7.

FIG. 5 shows the position of each of the change-over switches, the control system, and the voltage and current waveform of each unit in the second embodiment. FIG. 6 shows the relationship between the VDS pulse width, pulse frequency, and pulse peak value and the load factor of the second embodiment.

Next, the operation of this embodiment will be explained.

In the second embodiment, the control characteristic control circuit 52 always controls the change-over switch 12c so as to be in the same contact connection condition as that of the change-over switch 12b. The operations of the PWM control, PAM switch control, and linear regulator control are almost the same as those indicated in the first embodiment.

Figure 6:
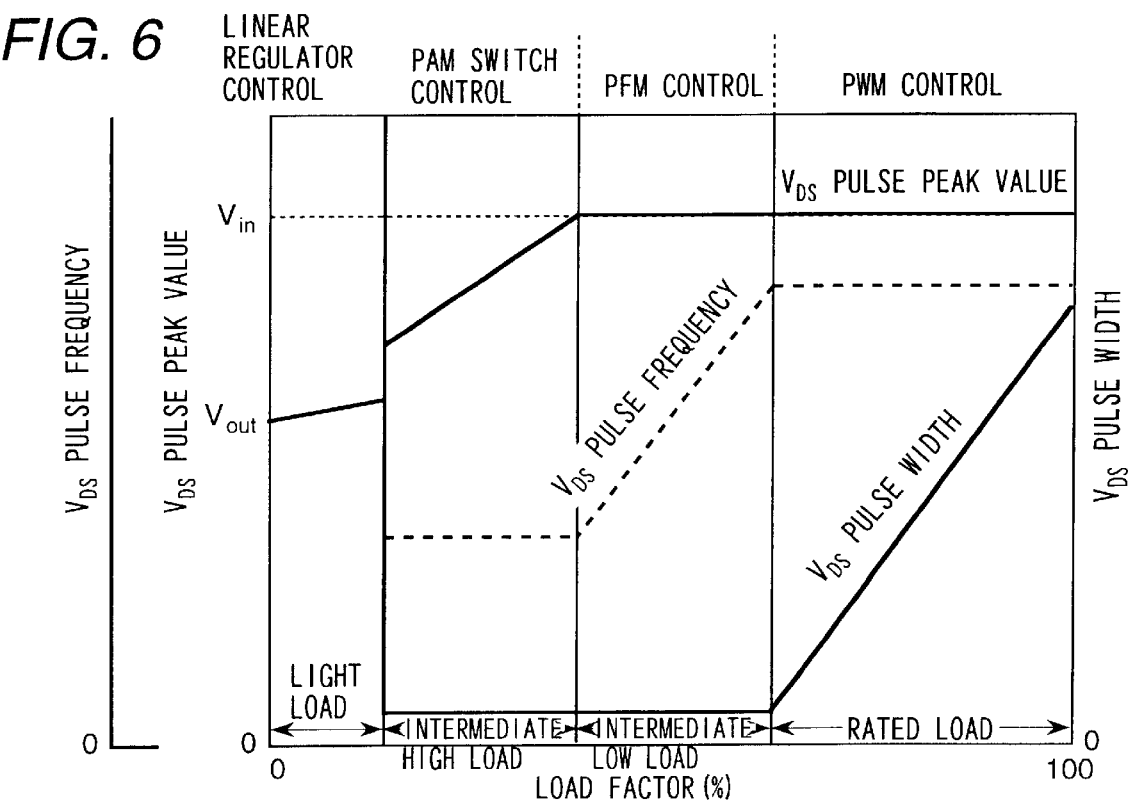
FIG. 6 is a characteristic diagram showing the relationship between the load factor, pulse width, pulse frequency, and pulse peak value of the second embodiment of the present invention.

In the second embodiment, the voltage control in the rated load area with a load factor of close to 100% is the PWM control as shown in FIGS. 5 and 6. The PWM control is control that the change-over switch 12a is connected to the contact A and the change-over switches 12b and 12c are connected to the contact B.

The output voltage Vout which is the voltage at both ends of the smoothing condenser 5 is input to the output feedback circuit 7 and the difference from the reference voltage 71 is output to the subtracter 72. The error voltage is amplified by the error amplifier 73 and output as an error voltage signal from the output feedback circuit 7. The error voltage signal is input to the limiter 93 in the switching control circuit 9. The limiter 93 specifies the ratio at the maximum and the ratio at the minimum of the PWM control. The error voltage signal is input to the comparator 92 via the limiter 93. The error voltage signal is also input to the limiter 94. The error voltage signal is input to the triangular wave generation means 91 via the limiter 94 and changes the frequency of a triangular wave generated from the triangular wave generation means 91. In the IWM control area, the output of the limiter 94 is constant and the frequency of the triangular wave generated from the triangular wave generation means 91 is constant and maximum.

The output of the limiter 9 is compared with the output of the triangular wave generation means 91 by the comparator 92 and output as a pulse train from the comparator 92. The change-over switch 12a is connected to the contact A, so that the pulse train output from the comparator 92 is input to the multiplier 13 via the change-over switch 12a. The change-over switch 12b is connected to the contact B, so that a fixed value which is the output of the fixed-value output means 10b is input to the multiplier 13 via the change-over switch 12b. The multiplier 13 does multiplication of the fixed value and pulse train and as a result, outputs a pulse train having a fixed peak value. The pulse train is input to the drive circuit 15a and the voltage VGa between the gate and the source as indicated in the PWM control column shown in FIG. 5 is output and applied between the gate and the source of the channel N power MOSFET8a. The peak value of the pulse train is sufficiently higher than the threshold voltage of the channel N power MOSFET8a, thereby the channel N power MOSFET8a performs the ON/OFF switching operation.

On the other hand, the output of the comparator 92 is input to the contact B of the change-over switch 12c via the NOT circuit 16. In the PWM control area, the change-over switch 12 is connected to the contact B, so that a signal which is an inverted pulse train of the comparator 92 is input to the drive circuit 15b, and the voltage VGb between the gate and the source as indicated in the PWM control column shown in FIG. 5 is output and applied between the gate and the source of the channel N power MOSFET8b, and the channel N power MOSFET8b performs the ON/OFF switching operation.

When the channel N power MOSFET8a is turned on and the channel N power MOSFET8b is turned off by application of the voltage between the gate and the source, the DC source 1, the DC reactor 4, and the smoothing condenser 5 are connected in series, and a current IL flows in the DC reactor 4, and the smoothing condenser 5 is charged. The inter-terminal voltage VDS of the channel N power MOSFET8b is almost equal to the input voltage Vin.

Although when the voltage between the gate and the source of the channel N power MOSFET8a is reduced to 0, the channel N power MOSFET8a is turned off, the channel N power MOSFET8b performs a complementary operation at the same time and is turned on. By doing this, the current IL flowing in the DC reactor 4 is subjected to the synchronous rectification of flowing in the drain direction from the source of the channel N power MOSFET8b. The drain voltage VDS of the channel N power MOSFET8b becomes a negative voltage which is lowered from 0 V by the ON voltage of the channel N power MOSFET8b, that is, by the product of the ON resistance and the supply current. As a result, in the inter-terminal voltage VDS of the channel N power MOSFET8b, a waveform as indicated in the PWM control column shown in FIG. 5 is generated. The DC reactor 4 and the smoothing condenser 5 smooth the voltage waveform VDS of the channel N power MOSFET8b. This control system operates so as to keep the output voltage Vout constant and ensure the output current Iout.

In the PWM control, when the load factor decreases, the error voltage signal output from the output feedback circuit 7 is reduced in number and the pulse width of the pulse train for driving between the gate and the source of the channel N power MOSFET8a is narrowed in correspondence with it. However, the minimum ON pulse width which is a minimum value of the pulse width is determined by the limiter 93 and when the load factor reduces to a predetermined value or less and enters the intermediate high load area and the gate pulse width of the channel N power MOSFET8a is narrowed to the neighborhood of a predetermined value, the PWM control is switched to the PFM (pulse frequency modulation system) control described below. In this case, the contact connection condition of each of the change-over switches 12a, 12b, and 12c is not changed.

In the PFM control, the operation of the circuit is almost the same as that of the PWM control. However, the pulse width of the inter-terminal voltage VDS of the channel N power MOSFET8b is constant and the VDS pulse frequency which is a pulse interval of the inter-terminal voltage VDS is changed. The error voltage signal of the output feedback circuit 7 is changed by changing of the load factor. When the error voltage signal is input to the triangular wave generation means 91 via the limiter 94, the frequency of a triangular wave output from the triangular wave generation means 91 is changed. Concretely, as shown in FIG. 6, as the load factor decreases, the VDS pulse frequency decreases. The limiter 94 operates so as to keep an error voltage signal input to the triangular wave generation means 91 in other than the PFM control area constant and keep the VDS pulse frequency unchanged. The VDS pulse frequency in this case is desired to be 20 kHz or more.

When the VDS pulse frequency (load factor) is reduced to a predetermined value (intermediate low load area), the PFM control is switched to the PAM switch control. Namely, the change-over switch 12a is kept in the contact A connection state and the change-over switches 12b and 12c are switched from the contact B to the contact A. By doing this, the output of the amplifier 11 is input to the multiplier 13 and multiplied by the pulse train which is the output of the comparator 92. As a result, the output of the multiplier 13 becomes a pulse train with the minimum ON pulse width whose peak value is changed according to the error voltage signal output from the output feedback circuit 7.

By doing this, the voltage between the gate and the source of the channel N power MOSFET8a which has the output waveform of the drive circuit 15a has a waveform as indicated in the PAM switch control column shown in FIG. 5. The peak value of this waveform is lower than the peak value of the gate voltage of at the time of the PWM control and PFM control and close to the threshold voltage of the channel N power MOSFET8a. When a voltage close to the threshold voltage is applied between the gate and the source of the channel N power MOSFET8a, the channel N power MOSFET8a has an extremely high ON resistance compared with a case turned ON in the PWM control or the PFM control, so that the inter-terminal voltage VDS of the power MOSFET8b is lower than the input voltage Vin like the waveform indicated in the PAM switch control column shown in FIG. 5.

The change-over switch 12c is connected to the contact A, so that the channel N power MOSFET8b is off. Therefore, the terminal voltage waveform VDS when the channel N power MOSFET8a is off is a negative voltage which is lowered from 0 V by the forward drop voltage of the internal parasitic diode of the power MOSFET8b. The DC reactor 4 and the smoothing condenser 5 smooth the voltage waveform VDS.

As mentioned above, the PAM switch control system controls the peak value of the gate voltage of the channel N power MOSFET8a so as to ensure the output current Iout and keep the output voltage Vout constant, thereby controls the peak value of the VDS pulse applied to the power MOSFET8b. In the PAM switch control area, as shown in FIG. 6, the pulse width and frequency of the voltage waveform VDS are constant and the peak value of the VDS pulse is changed according to the load factor.

In the PAM switch control, when the load factor decreases more, the error voltage signal output from the output feedback circuit 7 is reduced in number and the pulse peak value of the pulse train for driving between the gate and the source of the channel N power MOSFET8a is more reduced in correspondence with it. According to this embodiment, when the load factor reduces less than a predetermined value and enters the light load area, the PAM switch control is switched to the linear regulator control, which controls the output.

Switching from the PAM switch control to the linear regulator control is realized, as shown in FIG. 5, by switching the change-over switch 12a to the contact B with the contact A connection condition of the change-over switches 12b and 12c kept unchanged. By this switching, as shown in FIG. 4, the pulse train which is the output of the comparator 92 is not input to the multiplier 13 and a fixed value which is the output of the fixed-value output means 10a is input to the multiplier 13 instead of it. On the other hand, the error voltage signal output from the output feedback circuit 7 is input to the multiplier 13 via the amplifier 11 and the contact A of the change-over switch 12b.

As a result, the output of the multiplier 13 is on the continuous voltage level changing according to the error voltage signal output from the output feedback circuit 7. Therefore, the voltage VG between the gate and the source of the channel N power MOSFET8a which is the output of the drive circuit 15a has the waveform indicated in the linear regulator control column shown in FIG. 5. The peak value of the voltage VG between the gate and the source is also lower than the peak value of the voltage VG between the gate and the source in the PWM control or the PFM control in the same way as with the peak value in the case of the PAM switch control and close to the threshold voltage of the channel N power MOSFET8a. When a voltage close to the threshold voltage is applied between the gate and the source of the channel N power MOSFET8a, since the channel N power MOSFET8a has an extremely high ON resistance compared with a case turned ON in the PWM control, the inter-terminal voltage VDS of the channel N power MOSFET8a is a continuous value lower than the input voltage Vin like the waveform indicated in the linear regulator control column shown in FIG. 5.

As mentioned above, in the linear regulator control, a voltage close to the threshold voltage is continuously applied between the gate and the source of the channel N power MOSFET8a and the voltage is controlled, thereby the ON resistance of the channel N power MOSFET8a is continuously controlled. On the other hand, the change-over switch 12c is connected to the contact A, so that the channel N power MOSFET8b is always kept off. A smooth current flows in the DC reactor 4.

According to this embodiment, the load 6 is a device including a micro-computer and outputs an instruction signal to the output feedback circuit 7. By this instruction signal, the output feedback circuit 7 changes the reference voltage 71 and changes the output voltage of the DC-DC converter.

In this embodiment, instead of the channel N power MOSFET8a and 8b, another self arc-extinguishing type semiconductor device such as a bipolar transistor may be used. Further, a diode may be connected in parallel with the channel N power MOSFET8b so that the cathode pole is positioned on the drain side.

Further, unless the linear regulator control is executed, it is possible to respond to the range of load factor from 0 to 100% only by switching the PWM control, the PFM control, and the PAM switch control. In this case, the change-over switch 12a and the fixed-value output means 10a are not necessary.

Figure 7:
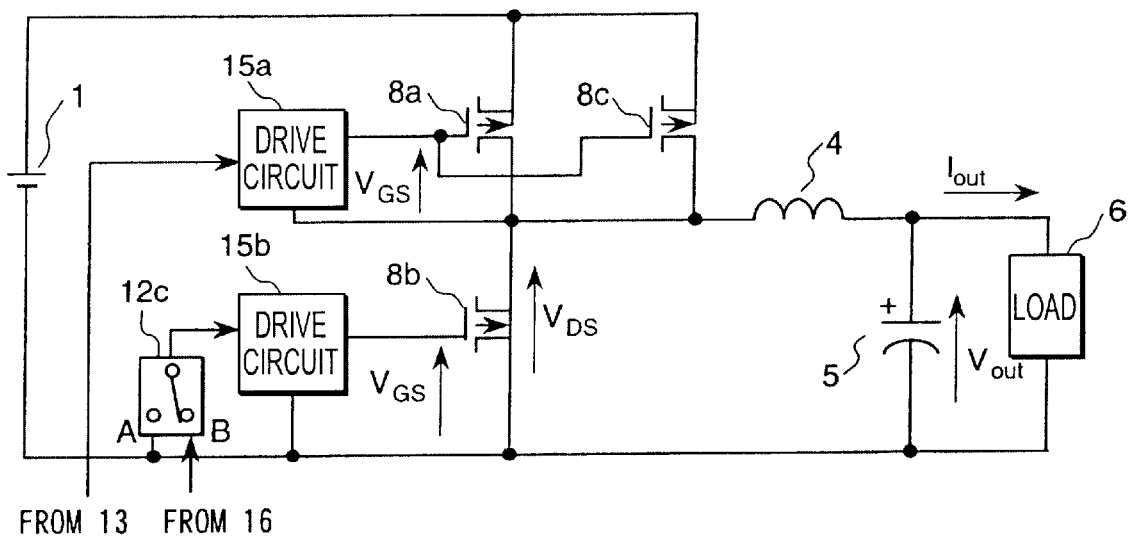
FIG. 7 is a block diagram of a DC-DC converter showing the third embodiment of the present invention.

Next, the third embodiment of the present invention will be explained by referring to FIGS. 7 and 8. In FIG. 7, the same reference numerals are assigned to the parts, circuits, and means having the same functions as those in the embodiments shown in FIGS. 1 and 4 and the duplicate explanation will be omitted.

In FIG. 7, numeral 8c indicates a channel N power MOSFET. The drain, gate, and source of the channel N power MOSFET8c are connected in parallel with the channel N power MOSFET8a. The other parts of the constitution and operation are as explained in the second embodiment, so that the figuring and explanation of a part of the circuit will be omitted.

Figure 8:
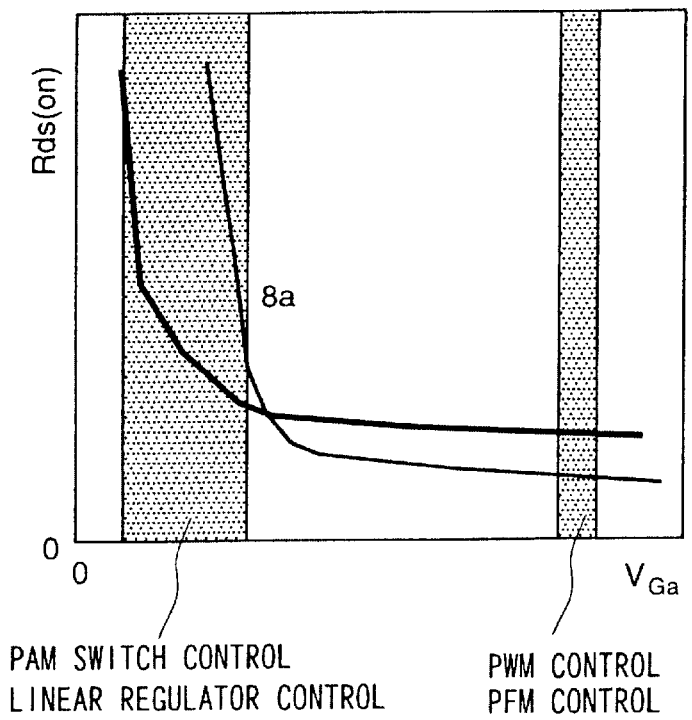
FIG. 8 is a characteristic diagram showing the relationship between the gate voltage and the ON resistance of two power MOSFETs used in the third embodiment of the present invention.

FIG. 8 is a characteristic diagram showing the relationship between the voltage VGa between the gate and the source and the ON resistance Rds (on) between the drain and the source of the channel N power MOSFET8a and channel N power MOSFET8c. The two channel N power MOSFET8a and 8b must have the characteristics shown in the characteristic diagram.

At the time of the PWM control and PFM control, a pulse train having the voltage VGa between the gate and the source within the range shown in FIG. 8 as a peak value is applied between the gate and the source of the channel N power MOSFET8a and 8c. In this case, the ON resistance of the channel N power MOSFET8c is higher than the ON resistance of the channel N power MOSFET8a, so that the current flowing from the DC source 1 during power ON flows mainly on the side of the channel N power MOSFET8a. On the other hand, at the time of execution of the PAM switch control or the linear regulator control, as shown in FIG. 8, the voltage VGa between the gate and the source which is sufficiently lower than that to be applied in the PWM control or PFM control is applied. Since the threshold voltage of the channel N power MOSFET8c is lower than that of the channel N power MOSFET8a, the ON resistance is inverted in this area and the ON resistance of the channel N power MOSFET8c is made lower than that of the channel N power MOSFET8a. And, the output control is executed by changing the peak value of the voltage VGa between the gate and the source to be given to the channel N power MOSFET8c and changing the ON resistance of the channel N power MOSFET8c.

In this embodiment, by use of a constitution that the two channel N power MOSFET8a and 8c having different characteristics are connected simply in parallel, at the time of the PWM control or the PFM control, the ON loss can be reduced by the channel N power MOSFET8a having a low ON resistance and on the other hand, at the time of the PAM switch control or the series regulator control, the channel N power MOSFET8a having a low ON resistance is turned off only by lowering the gate voltage and the output control can be executed using the characteristics of the channel N power MOSFET8c having a low threshold voltage and a high ON resistance.

Figure 9:
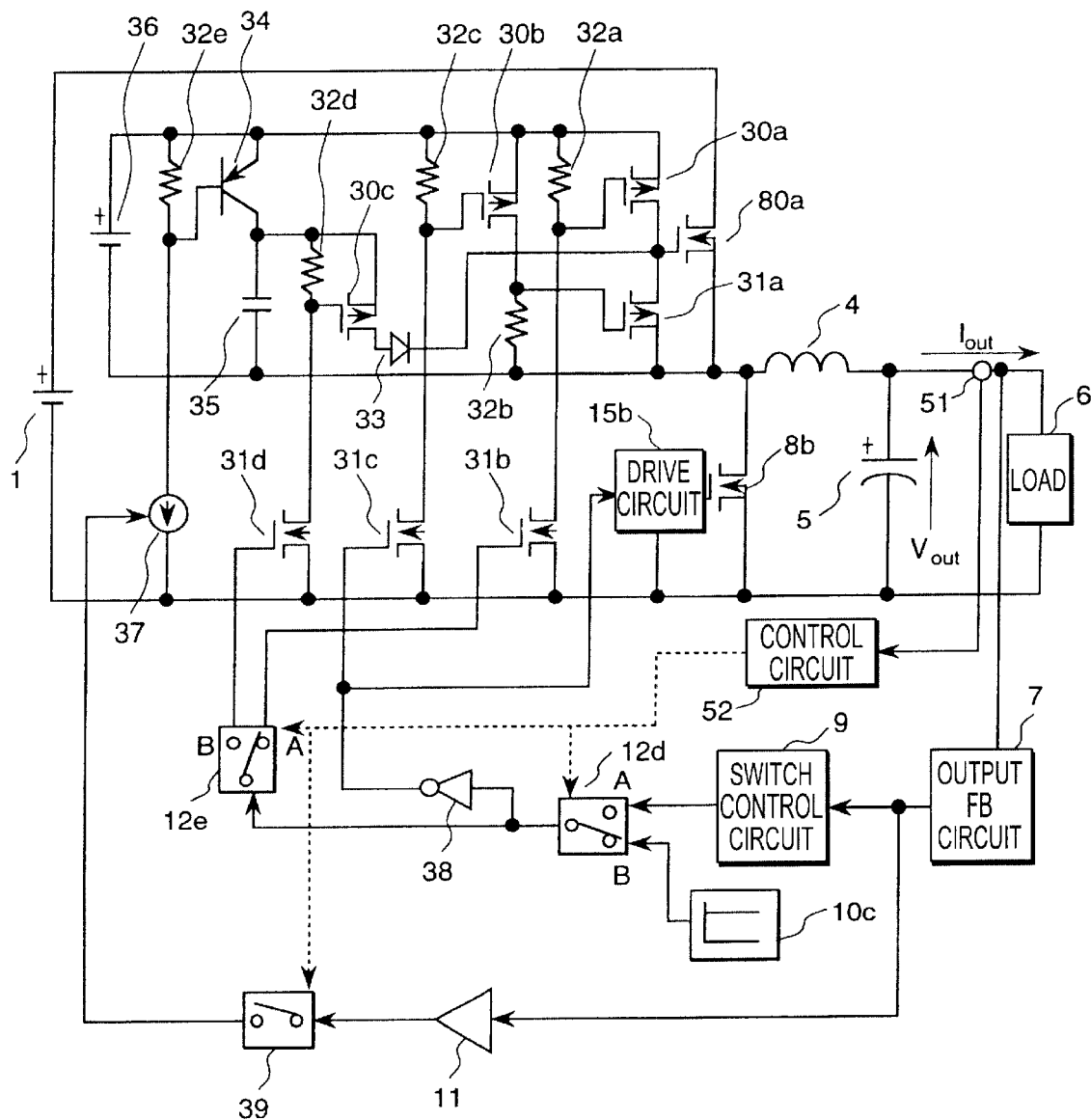
FIG. 9 is a block diagram of a DC-DC converter showing the fourth embodiment of the present invention.

Next, the fourth embodiment of the present invention will be explained by referring to FIGS. 9 and 10. In FIG. 9, the same reference numerals are assigned to the parts, circuits, and means having the same functions as those in the embodiments shown in FIGS. 1, 4, and 7 and the duplicate explanation will be omitted.

In FIG. 9, numeral 10c indicates a fixed-value output means, 12d and 12e change-over switches, 30a, 30b, and 30c channel P power MOSFETs, 31a, 31b, 31c, and 31d channel N power MOSFETs, 32a, 32b, 32c, 32d, and 32e resistors, 33 a diode, 34 a PNP transistor, 35 a capacitor, 36 a DC voltage source, 37 a variable current source, 38 a NOT circuit, and 39 a switch.

The positive pole side of the DC source 1 is connected to the drain of the channel N power MOSFET8a. The negative pole side of the DC source 1 is connected to the variable current source 37, the source of the channel N power MOSFET31d, the source of the channel N power MOSFET31c, the source of the channel N power MOSFET31b, the drive circuit 15b, the source of the channel N power MOSFET8b, the negative pole side of the smoothing condenser 5, and one end of the load 6.

The positive pole side of the DC voltage source 36 is connected to the resistor 32e, the emitter of the PNP transistor 34, the resistor 32c, the resistor 32a, the source of the channel P power MOSFET30a, and the source of the channel P power MOSFET3b respectively. The negative pole side of the DC voltage source 36 is connected to the capacitor 35, the resistor 32b, the source of the channel N power MOSFET31a, the source of the channel N power MOSFET8a, the DC reactor 4, and the source of the channel N power MOSFET8b respectively.

The other end of the resistor 32e is connected to the base of the PNP transistor 34 and the variable current source 37. The collector of the PNP transistor 34 is connected to the other end of the capacitor 35, the resistor 32d, and the source of the channel P power MOSFET30c. The other end of the resistor 32d is connected to the gate of the channel P power MOSFET30c and the drain of the channel N power MOSFET31d. The drain of the channel P power MOSFET30c is connected to the anode of the diode 33. The cathode of the diode 33 is connected to the gate of the channel N power MOSFET8a, the drain of the channel P power MOSFET30a, and the drain of the channel N power MOSFET31a. The other end of the resistor 32c is connected to the gate of the channel P power MOSFET30b and the drain of the channel N power MOSFET31c. The drain of the channel P power MOSFET30b is connected to the other end of the resistor 32b and the gate of the channel N power MOSFET31a. The other end of the resistor 32a is connected to the gate of the channel P power MOSFET30a and the drain of the channel N power MOSFET31b. The other end, of the DC reactor 4 is connected to the positive pole side of the smoothing condenser 5, the load 6, and the output feedback circuit 7.

The error voltage signal output from the output feedback circuit 7 is input to the switching control circuit 9 and the amplifier 11. The output of the switching control circuit 9 is input to the contact A of the change-over switch 12d. The output of the fixed-value output means 10c is input to the contact B of the change-over switch 12d and the output of the change-over switch 12d is input to the NOT circuit 38 and the change-over switch 12e. The output of the NOT circuit 38 is input to the gate of the channel N power MOSFET31c and the drive circuit 15b. The contact A of the change-over switch 12e is connected to the gate of the channel N power MOSFET31b. The contact B of the change-over switch 12e is connected to the gate of the channel N power MOSFET31d. The output of the amplifier 11 is input to the variable current source 37 via the switch 39.

The change-over switches 12e and 12d and the switch 39 are controlled by the control characteristic control circuit 52.

Next, the operation will be explained. Also in this embodiment, in the same way as with the second embodiment, the PWM control, PFM control, PAM switch control, and linear regulator control are switched depending on the load factor. The positions of the change-over switches 12d and 12e and the switch 39 in each control system are shown in FIG. 10.

Firstly, in the PWM control, the change-over switches 12d and 12e are connected to the contact A and the switch 39 is turned off. At this time, the switching control circuit 9 outputs the PWM pulse and drives the gate of the channel N power MOSFET31b. When the channel N power MOSFET31b is turned on, a current flows and a voltage drop is generated in the resistor 32a, thereby the channel P power MOSFET30a is turned on. When the channel N power MOSFET31b is turned off, the voltage drop in the resistor 32a is stopped and the channel P power MOSFET30a is turned off.

The PWM pulse which is the output of the switching control circuit 9 is inverted by the NOT circuit 38 and drives the channel N power MOSFET8b via the channel N power MOSFET31c and the drive circuit 15b. When the channel N power MOSFET31c is turned on, a voltage drop is generated in the resistor 32c, thereby the channel P power MOSFET30b is turned on and a voltage drop is generated in the resistor 32b, thereby the channel N power MOSFET31a is turned on. When the channel IN power MOSFET31c is turned off, the voltage drop in the resistor 32c is stopped and the channel P power MOSFET30b is turned off and the channel N power MOSFET31a is also turned off.

Therefore, when the output of the switching control circuit 9 is on the high (H) level, the channel P power MOSFET30a is turned on and the channel N power MOSFET31a is turned off, so that the channel N power MOSFET8a is turned on and the channel N power MOSFET8b is turned off. When the output of the switching control circuit 9 is on the low (L) level inversely, the channel N power MOSFET8b is turned on, and the channel P power MOSFET30a is turned off, and the channel N power MOSFET31a is turned on, and the channel N power MOSFET8a is turned off. As a result, the channel N power MOSFET8*a* and the channel N power MOSFET8*b* perform a complementary operation and control the output voltage constant.

Next, the PFM control will be explained. Also in the PFM control, the positions of the change-over switches 12*d* and 12*e* and the switch 39 are the same as those of the PWM control and as mentioned above, according to the output pulse of the switching control circuit 9, the channel N power MOSFET8*a* and the channel N power MOSFET8*b* perform the complementary operation and control the output constant. A difference from the PWM control is that the pulse width is constant and the pulse frequency is changed.

Next, the PAM switch control will be explained. In the PAM switch control, the change-over switch 12*e* is switched to the contact B and the switch 39 is turned on. By this switching operation, the channel P power MOSFET30*a* switched in the PWM control or PFM control is turned off and instead of it, the channel N power MOSFET31*d* is pulse-controlled and the channel P power MOSFET30*c* is switched. Further, the output of the amplifier 11 is input to the variable current source 37 and controls the base current of the PNP transistor. As a result, a voltage which is lower than that of the DC voltage source 36 and corresponds to the error voltage signal output from the output feedback circuit 7 is generated in the capacitor 35.

As a result, when the channel P power MOSFET30*c* is turned on, the voltage of the capacitor 35 is applied to the gate of the channel N power MOSFET8*a*. Since the voltage of the capacitor 35 is close to the threshold voltage of the channel N power MOSFET8*a*, the channel N power MOSFET8*a* has a very high ON resistance and is turned on. On the other hand, when the channel P power MOSFET30*c* is turned off, the channel N power MOSFET31*a* is turned on, thereby the gate of the channel N power MOSFET8*a* is reduced to 0 V and turned off perfectly. As a result, the peak value of the pulse voltage generated between the terminals of the channel N power MOSFET8*a* is lower than the peak value of the DC source 1, thus the output voltage Vout can be controlled.

Next, the linear regulator control will be explained. In the linear regulator control, the change-over switch 12*d* is switched to the contact B. By this switching, the channel N power MOSFET31*d* is turned on, and the channel P power MOSFET30*c* is turned on, and the channel N power MOSFET31*c*, 31*b*, 31*a*, and 8*b* are turned off, and the channel P power MOFET30*a* is turned off. Therefore, the voltage of the capacitor 35 is applied to the channel N power MOSFET8*a* via the channel P power MOSFET30*c* and the diode 33 and the gate voltage is controlled, thereby the ON resistance of the channel N power MOSFET is changed and the output voltage Vout can be controlled. Also in the fourth embodiment, each control is switched by the control characteristic control circuit 52 depending on the load factor.

Figure 11:
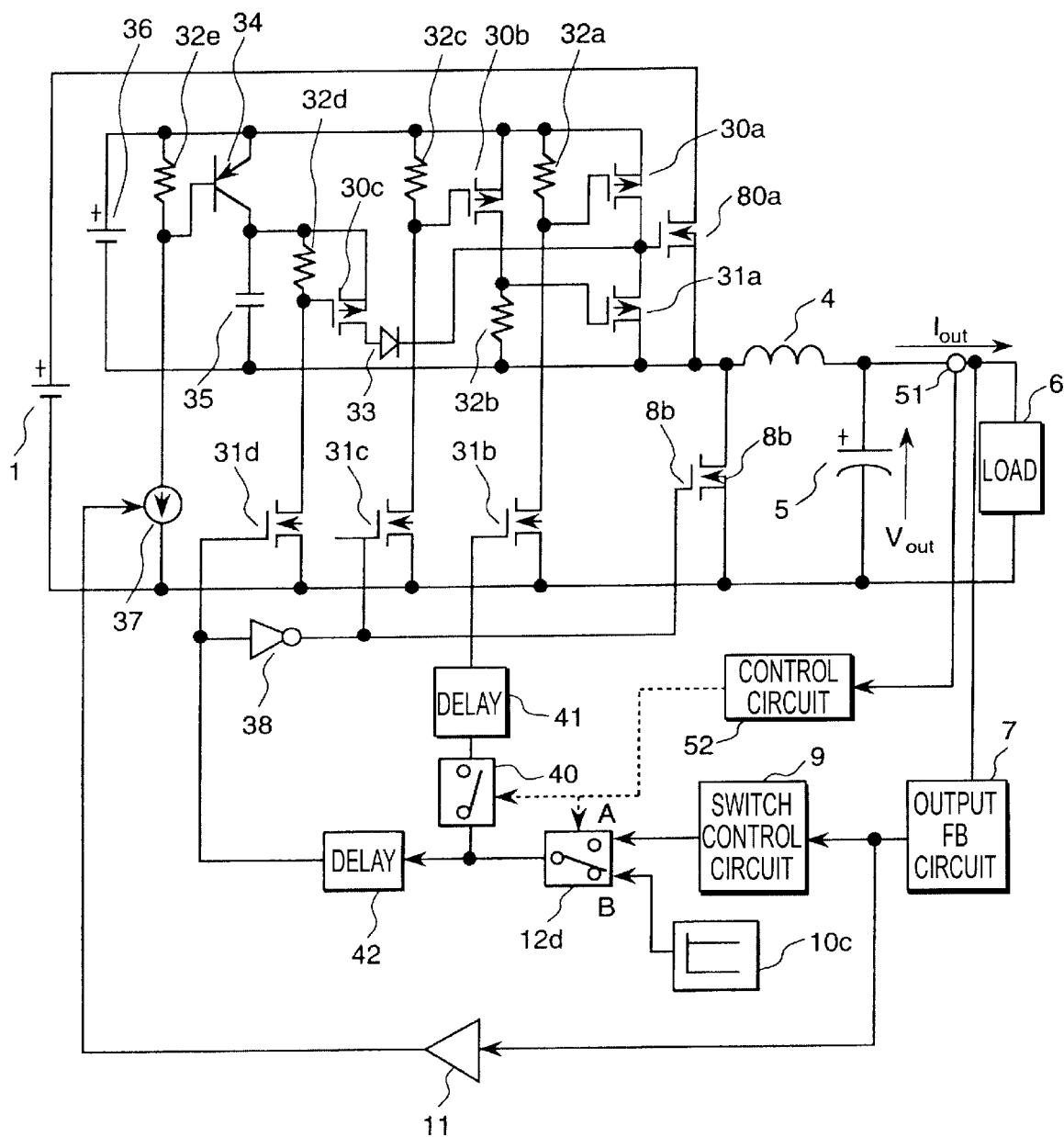
FIG. 11 is a block diagram of a DC-DC converter showing the fifth embodiment of the present invention.

Next, the fifth embodiment of the present invention will be explained by referring to FIGS. 11, 12, and 13. In FIG. 11, the same reference numerals are assigned to the parts, circuits, and means having the same functions as those in the embodiments shown in FIGS. 1, 4, 7, and 9 and the duplicate explanation will be omitted.

In FIG. 11, numeral 40 indicates a switch and 41 and 42 indicate delay circuits. The positive pole side of the DC source 1 is connected to the drain of the channel N power MOSFET8*a*. The negative pole side of the DC source 1 is connected to the variable current source 37, the source of the channel N power MOSFET31*d*, the source of the channel N power MOSFET31*c*, the source of the channel N power MOSFET31*b*, the drive circuit 15*b*, the source of the channel N power MOSFET8*b*, the negative pole side of the smoothing condenser 5, and one end of the load 6.

The positive pole side of the DC voltage source 36 is connected to the resistor 32*e*, the emitter of the PNP transistor 34, the resistor 32*c*, the resistor 32*a*, the source of the channel P power MOSFET30*a*, and the source of the channel P power MOSFET3*b* respectively and the negative pole side is connected to the capacitor 35, the resistor 32*b*, the source of the channel N power MOSFET31a, the source of the channel N power MOSFET8*a*, the DC reactor 4, and the source of the channel N power MOSFET8*b* respectively. The other end of the resistor 32*e* is connected to the base of the PNP transistor 34 and the variable current source 37. The collector of the PNP transistor 34 is connected to the other end of the capacitor 35, the resistor 32*d*, and the source of the channel P power MOSFET30*c*. The other end of the resistor 32*d* is connected to the gate of the channel P power MOSFET30*c* and the drain of the channel N power MOSFET31*d*. The drain of the channel P power MOSFET30*c* is connected to the anode of the diode 33.

The cathode of the diode 33 is connected to the gate of the channel N power MOSFET8*a*, the drain of the channel P power MOSFET30*a*, and the drain of the channel N power MOSFET31*a*. The other end of the resistor 32*c* is connected to the gate of the channel P power MOSFET30*b* and the drain of the channel N power MOSFET31*c*.

The drain of the channel P power MOSFET30*b* is connected to one end of the resistor 32*b* and the gate of the channel N power MOSFET31*a*. The other end of the resistor 32*a* is connected to the gate of the channel P power MOSFET30*a* and the drain of the channel N power MOSFET31*b*. The other end of the DC reactor 4 is connected to the positive pole side of the smoothing condenser 5, the load, and the output feedback circuit 7.

The error voltage signal output from the output feedback circuit 7 is input to the switching control circuit 9 and the amplifier 11. The output of the switching control circuit 9 is input to the contact A of the change-over switch 12*d*. The output of the fixed-value output means 10*c* is input to the contact B of the change-over switch 12*d* and the output of the change-over switch 12*d* is input to the switch 40 and the relay circuit 42. The output of the switch 40 is input to the delay circuit 41. The output of the delay circuit 41 is input to the gate of the channel N power MOSFET31*b*. The output of the delay circuit 42 is input to the NOT circuit 38 and the gate of the channel N power MOSFET31*d*. The output of the NOT circuit 38 is input to the gate of the channel N power MOSFET31*c* and the gate of the channel N power MOSFET8*b*. The output of the amplifier 11 is input to the variable current source 37.

FIG. 12 shows the positions of the change-over switch 12*d* and the switch 40 in each control system of the fifth embodiment. The change-over switch 12*d* and the switch 40 are controlled by the control characteristic control circuit 52. FIG. 13 is a waveform diagram of each unit at the time of the PWM control and PFM control in the fifth embodiment.

The operation of the fifth embodiment is almost the same as that of the fourth embodiment mentioned above. A difference will be described hereunder.

Figure 13:
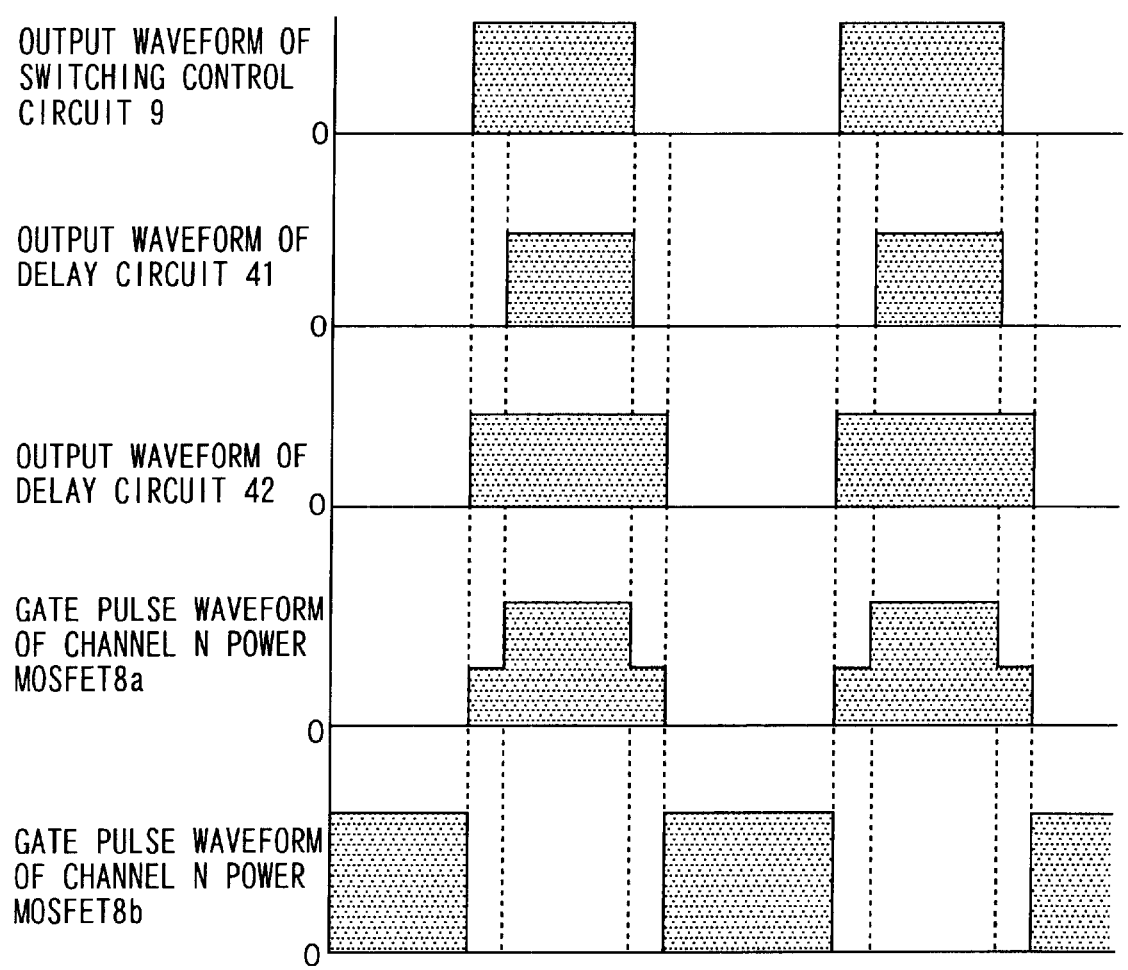
FIG. 13 :Ls a drawing showing the waveform of each unit at the time of the PWM control and PFM control of the fifth embodiment of the present invention.

The output pulse of the switching control circuit 9 has the waveform shown in FIG. 13 at the time of the PWM control or PFM control. The change-over switch 12*d* is connected to the contact A as shown in FIG. 12 and the switch 40 is on, so that the output pulse of the switching control circuit 9 is input to the delay circuits 41 and 42. The delay circuit 41 has the delay characteristic at the time of pulse start-up and no delay characteristic at the time of pulse shut-down. Therefore, the output pulse of the delay circuit 41 has a waveform that the start-up is delayed against the pulse of the switching control circuit 9. This pulse is applied to the gate of the channel N power MOSFET31b.

On the other hand, the delay circuit 42 has no delay characteristic at the time of pulse start-up and the delay characteristic at the time of shut-down. Therefore, to the gate of the channel N power MOSFET31d, the waveform of the delay circuit 42 as shown in FIG. 13 is applied. To the gates of the channel N power MOSFET31c and the channel N power MOSFET8b, a waveform that the output waveform of the delay circuit 42 is inverted is input.

As a result, to the gate of the channel N power MOSFET8a, as shown in the drawing, a gate pulse waveform having voltages at two stages such as a low gate voltage at the time of turning on and turning off and a high gate voltage at time of turning on is applied. The channel N power MOSFET8a becomes a high ON resistor when a low gate voltage in the neighborhood of the threshold voltage is applied at the time of turning on and turning off. Therefore, the current change rate (di/dt) of the channel N power MOSFET8a at the time of turning on and turning off is suppressed. By doing this, particularly a leap voltage generated between the terminals of the channel N power MOSFET8a at the time of turning off is suppressed, so that the voltage stress given to the device can be suppressed. Further, the parasitic oscillation can be suppressed by it and the switching noise given to the load 6 can be suppressed.

On the other hand, at the time of switching of the channel N power MOSFET8a and the channel N power MOSFET8b, when both switching devices are turned on, the DC source 1 is short-circuited and an excessive through current flows. To prevent it, a dead time is generally provided. In this embodiment, even if a period of short-circuit of the DC source 1 is generated, the ON resistance of the channel N power MOSFET8a is high, so that no excessive through current is generated. Therefore, the dead time can be made shorter than that of a conventional circuit or can be omitted. Since the dead time width can be narrowed or omitted, the switching frequency can be increased and the ratio at the time of turning on can be increased, thereby the control capacity is improved. Further, the power MOSFET can be prevented from destruction due to the through current.

Since the through current can be prevented and a leap voltage at the time of switching can be suppressed, an effect is produced such that noise generated in the power unit is reduced. Therefore, the filter circuit for noise absorption necessary for a conventional DC-DC converter may be made compact or omitted and miniaturization of the converter, reduction in the number of parts, and prevention of malfunctions can be realized.

Figure 14:
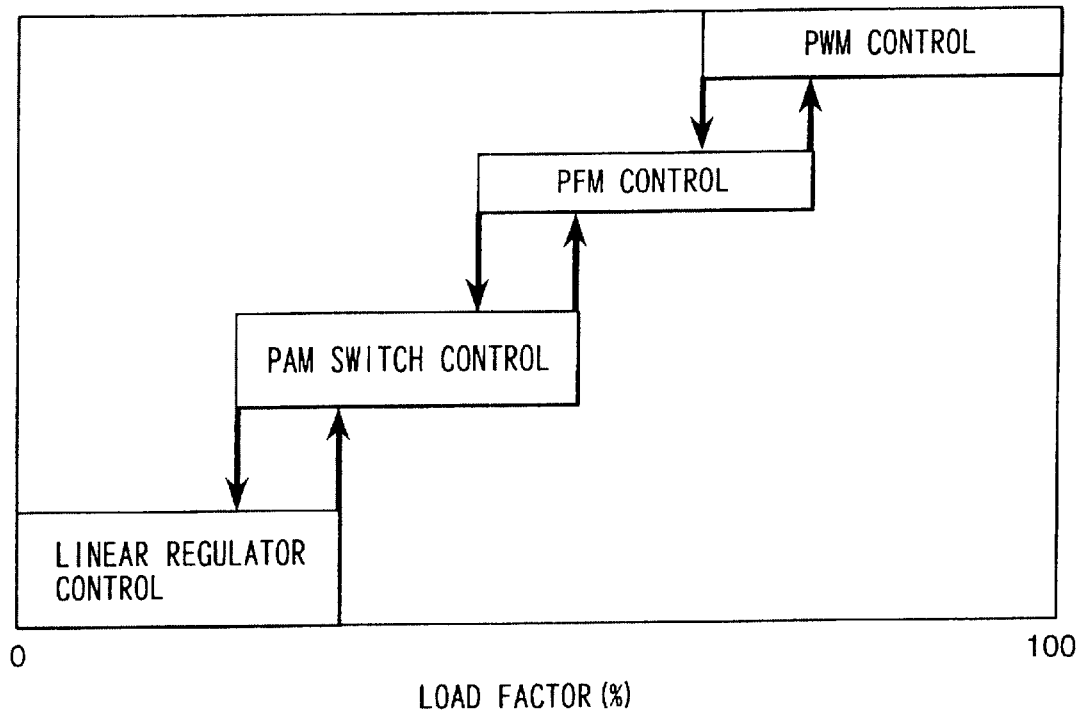
FIG. 14 is a drawing showing the relationship between the load factor and transfer to each control system of the sixth embodiment of the present invention.
Figure 15:
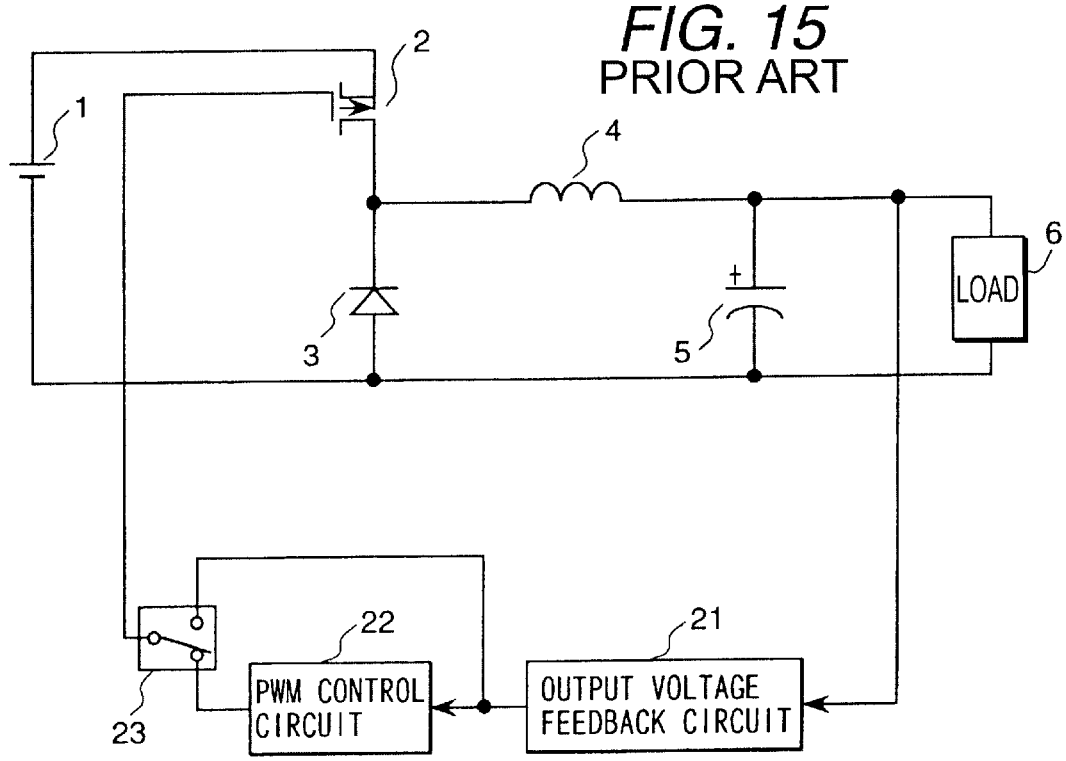
FIG. 15 is a block diagram of a conventional DC-DC converter.

Next, the sixth embodiment of the present invention will be explained by referring to FIG. 14. FIG. 14 is a drawing showing the relationship between the load factor and each control system.

The control system of the sixth embodiment, as shown in FIG. 14, switches the PWM control, PFM control, PAM switch control, and linear regulator control with hysteresis characteristics in the descending order of the load factor. The circuit constitution and the control method of each control are the same as those of the respective embodiments mentioned above. Each arrow between the respective kinds of control indicates the transfer point to each control.

The load factor at the transfer point from the PFM control to the PWM control is made higher than the load factor at the transfer point from the PWM control to the PFM control. In the same way, the load factor at the transfer point from the PAM switch control to the PFM control is made higher than the load factor at the transfer point from the PFM control to the PAM switch control. Further, the load factor at the transfer point from the linear regulator control to the PAM switch control is made higher than the load factor at the transfer point from the PAM switch control to the linear regulator control.

If a hysteresis is provided at a point for switching the control system like this, when the load factor changes in the neighborhood of the transfer point, it can be prevented that the control system changes frequently and the output becomes unstable.

The present invention, in a portable information device such as a portable telephone and a mobile-related device, can improve the power supply efficiency particularly in a light load area. As a result, there is an advantage available such that the time for operating a device with a battery can be made longer than that of a conventional one.

Since the output voltage can be controlled without reducing the switching frequency so much like a conventional one, a high speed response of control, prevention of occurrence of audible sound, and a long life span of an electrolytic capacitor due to reduction in the ripple current can be realized.

Further,, a through current and a leap voltage at the time of switching can be suppressed, so that malfunctions of a portable information device due to noise generated from the power supply can be suppressed. Since the noise filter can be omitted or made compact, miniaturization and lightweight of the converter can be realized.

What is claimed is:

1. A DC-DC converter for converting and outputting a voltage of a DC source to a lower DC voltage by controlling a first semiconductor device, characterized in that a pulse train is applied to a control terminal of said first semiconductor device, a peak value of the pulse train applied to the control terminal of said first semiconductor device is changed based on a feedback of the DC voltage to be output, and thereby an ON voltage of said first semiconductor device is adjusted and said DC voltage to be output is controlled stably.

2. A DC-DC converter according to claim 1, wherein a series circuit of a reactor and charge storage means is connected to said first semiconductor device in series, and said voltage of said DC source is applied to both ends of said series circuit so that an end of said series circuit on a first semiconductor device side becomes a positive pole, and a second semiconductor device is connected to said series circuit of said reactor and said charge storage means in parallel, when said first semiconductor device is on, said second semiconductor device is kept off, a current flows from said DC source into said reactor, and said charge storage means is charged, and when said first semiconductor device is off, said second semiconductor device is kept on, a synchronous rectification control function for flowing said current of said reactor back to said second semiconductor device is provided, and at least at the time of controlling changing of said peak value of said pulse train, said first semiconductor device is turned off, thereby no synchronous rectification is carried out.

3. A DC-DC converter according to claim 2, wherein a plurality of power MOSFETs are connected and used in parallel as said first semiconductor device, a threshold voltage of at least one of said power MOSFETs is higher than threshold values of other parallel power MOSFETs, and an ON resistance of said one power MOSFET is equal to or lower than ON resistances of said other parallel power MOSFETs.

4. A DC-DC converter according to claim 1, wherein said pulse train to be applied to said control terminal of said first semiconductor device has a first peak value from a pulse start-up time to a predetermined time and a second peak value after lapse of said predetermined time, and said second peak value is higher than said first peak value.

5. A DC-DC converter according to claim 4, wherein a third peak value lower than said peak value of said second pulse is applied to said control terminal of said semiconductor device for a predetermined time and then said pulse is shut down.

6. A DC-DC converter for converting and outputting a voltage of a DC source to a lower DC voltage by controlling a semiconductor device, characterized in that a pulse train is applied to a control terminal of said semiconductor device, a peak value of the pulse train applied to the control terminal of said semiconductor device is changed based on a feedback of the DC voltage to be output, thereby an ON voltage of said semiconductor device is adjusted, and when a load factor is lower than a predetermined value, control for applying said pulse train to said control terminal is changed to control for continuously increasing or decreasing said voltage to be applied to said control terminal, thereby said output voltage is controlled stably.

7. A non-insulated voltage drop type DC-DC converter for converting and outputting the voltage of a DC source to a lower DC voltage by controlling a semiconductor device, characterized in that at a rated load, a pulse width of a pulse train to be applied to a control terminal of said semiconductor device is adjusted to a predetermined value or more and an output voltage is controlled, and when an output current is reduced to a first predetermined value or less, said pulse width is adjusted to said predetermined value, a frequency of said pulse train is limited to a predetermined value or higher, and said output voltage is controlled; and when said output current is reduced less than a third value which is smaller than a second value, control for applying said pulse train to said control terminal is changed to control for continuously increasing or decreasing a voltage amplitude of said pulse train to be applied to said control terminal, thereby said output voltage is controlled stably.

8. A DC-DC converter according to claim 7, wherein at a no-load, said output voltage is controlled by continuously increasing or decreasing said voltage to be applied to said control terminal; when said output current increases to a fourth value or more which is larger than said third value, said frequency is set to said predetermined value, said peak value of said pulse train is changed, thereby said ON voltage of said semiconductor device is adjusted, and said output voltage is controlled; when said output current increases to a fifth value or more which is larger than said second value, said pulse width is set to said predetermined value, said frequency of said pulse train is limited to said predetermined value or higher, and said output voltage is controlled; and when said output current increases to more than a sixth value which is larger than said first value, said pulse width of said pulse train to be applied to said control terminal of said semiconductor device is set to said predetermined value or more, and said output voltage is controlled stably.

9. A DC-DC converter for converting and outputting a voltage of a DC source to a lower DC voltage by controlling a semiconductor device, characterized in that a pulse width of a pulse train to be applied to a control terminal of said semiconductor device is adjusted and an output voltage is controlled, and when an output current is reduced to a predetermined value or less, a peak value of said pulse train is changed in a state that said pulse width is kept at a predetermined value, thereby an ON voltage of said semiconductor device is adjusted and said output voltage is controlled stably.

10. A DC-DC converter for converting and outputting a voltage of a DC source to a lower DC voltage by controlling a semiconductor device, characterized in that a frequency of a pulse train to be applied to a control terminal of said semiconductor device is adjusted and an output voltage is controlled, and when an output current is reduced to a predetermined value or less, said frequency is kept at a predetermined value and a peak value of said pulse train is changed, thereby an ON voltage of said semiconductor device is adjusted and said output voltage is controlled stably.

11. A DC-DC converter according to claim 10, wherein said predetermined frequency is 20 kHz or more.

12. A DC-DC converter for converting and outputting a voltage of a DC source to a lower DC voltage by controlling a semiconductor device, characterized in that when a load factor is higher than a predetermined value, a frequency of a pulse train to be applied to a control terminal of said semiconductor device is controlled, and when said load factor is lower than said predetermined value, a peak value of said pulse train is changed, thereby an ON voltage of said semiconductor device is adjusted and said output voltage is controlled stably.

13. A DC-DC converter according to claim 12, wherein said DC voltage to be output is changed depending on an instruction from said load.

14. A DC-DC converter for converting and outputting a voltage of a dc source to a more lower dc voltage by controlling a semiconductor device characterized in that said dc source is connected to one output terminal of said semiconductor device and a peak value of a pulse voltage to be output to another output terminal of said semiconductor device is changed, thereby said output voltage is controlled stably.

* * * * *